United States Patent [19]

Ott et al.

[11] Patent Number: 5,095,814
[45] Date of Patent: Mar. 17, 1992

[54] BREAD TOASTER WITH AN EXTRA-LIFT FOR THE TOASTING RACK

[75] Inventors: Gabriele Ott, Königstein; Bernd Pfeiffer, Oberursel; Stefan Schamberg, Usingen; Karl Kurth, Neu-Anspach, all of Fed. Rep. of Germany

[73] Assignee: Braun Aktiengesellschaft, Frankfurt, Fed. Rep. of Germany

[21] Appl. No.: 678,581

[22] Filed: Apr. 1, 1991

[30] Foreign Application Priority Data

Apr. 4, 1990 [DE] Fed. Rep. of Germany ....... 4010779

[51] Int. Cl.$^5$ .............................................. A47J 37/08
[52] U.S. Cl. ................................... 99/391; 99/329 R; 99/385; 99/389; 99/393
[58] Field of Search ................. 99/327, 329 R, 329 P, 99/329 RT, 332, 385, 389, 390–393, 396, 399; 219/521, 537, 385

[56] References Cited

U.S. PATENT DOCUMENTS

| | | | |
|---|---|---|---|
| 2,155,852 | 4/1939 | Anderson et al. | 99/391 |
| 2,829,230 | 4/1958 | Remy | 99/329 R |
| 3,558,855 | 1/1971 | Stanek et al. | 219/385 |
| 3,880,063 | 4/1975 | Pestka | 99/393 |
| 3,986,444 | 10/1976 | Caudron | 219/521 |
| 4,201,124 | 5/1980 | Huggler | 99/385 |
| 4,345,515 | 8/1982 | Holt | 99/327 |
| 4,404,899 | 9/1983 | Weiss | 99/391 |
| 4,878,423 | 11/1989 | Birkert et al. | 99/391 |
| 4,976,195 | 12/1990 | Cavazos | 99/393 |
| 4,986,173 | 1/1991 | Hahnewald et al. | 99/389 |

FOREIGN PATENT DOCUMENTS

| | | | |
|---|---|---|---|
| 2942890 | 4/1981 | Fed. Rep. of Germany. | |
| 3218570 | 11/1983 | Fed. Rep. of Germany | 99/385 |

*Primary Examiner*—Timothy F. Simone
*Attorney, Agent, or Firm*—Fish & Richardson

[57] ABSTRACT

The invention is directed to a bread toaster comprising a carriage (4) which is manually slidable in a guide (3) between an upper and a lower limit position by means of a handle (6). Moving in conjunction with the carriage (4) is a toasting rack (2) which is adapted to receive an article to be toasted (22), with the upper limit position of the carriage (4) serving to receive or withdraw the article (22), while the lower limit position serves for turning the power on and for toasting the article (22). The bread toaster includes an extra-lift device (11) which is operated by a control knob (8) to enable the toasting rack (2) to be raised relative to the carriage (4). According to the invention, the extra-lift device (11) is carried by the carriage (4) and/or by the toasting rack (2).

20 Claims, 5 Drawing Sheets

BREAD TOASTER WITH AN EXTRA-LIFT FOR THE TOASTING RACK

This invention relates to a bread toaster, with a carriage manually slidable in a guide between an upper and a lower limit position by means of a manual operating handle, with a toasting rack adapted to receive an article to be toasted and moving in conjunction with the carriage, with the upper limit position of the carriage serving to receive or withdraw the article, while the lower limit position serves for turning the power on and for toasting the article, and with an extra-lift device operated by a control knob to enable the toasting rack to be raised relative to the carriage.

BACKGROUND OF THE INVENTION

German Industrial Standards relating to "Elektrische Haushalt-Brotröster mit und ohne Brötchenaufsatz" (Electric Domestic Bread Toasters with and without Roll Warmer Attachment, DIN 44 542, specify that "it shall be possible to grasp toasted bread slices, after they are in a position ready for removal, without any auxiliary means being required. This requirement shall be deemed to be satisfied if each slice of toasted bread protrudes by at least 30 mm out of the toasting chamber when in its most favorable position after being placed in a position ready for removal. The pop-up mechanism shall operate in such a manner that the toasted bread slices are not ejected out of the toasting chamber."

In conventional bread toasters, this DIN requirement is only satisfied if usual commercial toast slices are used. If an operator intends to toast brown bread of particularly small dimensions as, for example, the ends of a loaf, these do not, as a rule, extend out of the toasting chamber by the required minimum of 30 mm when in a position ready for removal. Frequently, they are still completely submerged in the depths of the toast well.

To remedy this deficiency, DE-29 42 890 A1 describes a bread toaster which, in addition to the lifting device, has an extra-lift device which is used whenever the toasted article fails to project by at least 30 mm out of the toasting chamber after it is placed in a position ready for removal. Thus, with the toaster in the position ready for removal of the toasted article, this extra-lift device enables toasted slices which project from the toasting chamber only slightly or not at all to be raised by an additional amount so that they protrude from the toasting chamber in a manner sufficient for easy removal from the toasting chamber and thus from the bread toaster by hand.

In this bread toaster, the extra-lift device comprises a control knob provided on the opposite side of the handhold on the toaster housing, the control knob having a transmission lever engaging underneath the toasting rack resting on the carriage in order to raise the toasting rack farther upwardly independently of the carriage in the toast-removing position of the carriage. Each movement of the carriage by raising or lowering the handle also involves a turning motion of the control knob which, however, occurs in a direction different from the direction of movement of the handle. While the direction of movement of the handle is parallel to the guide rods of the carriage, that is, perpendicular to the surface on which the toaster sits, a rotary motion results on the control knob which is parallel to the end panel of the bread toaster.

The different directions of motion adversely affect functionality and handling of a bread toaster, because the controls operating to raise the toasting rack, that is, the handle and the control knob, are arranged on opposite end panels of the bread toaster. Because the sole operation of the handle also causes the control knob to be turned since the two controls are coupled together, an operator is likely to confuse the control knob with the handle.

SUMMARY OF THE INVENTION

It is therefore an object of the present invention to provide a bread toaster in which the control knob of the extra-lift device executes a movement in the same direction as the handle itself, as the carriage is lowered and raised by operation of the handhold. Also, the control knob is to maintain its distance relative to the handhold on operation of the handhold.

This object is achieved, according to the present invention, in that the extra-lift device is carried by the carriage and/or by the toasting rack. As a result of this arrangement, the control knob coupled to the extra-lift device invariably covers the same distance as the handle when the handhold is operated to raise or lower the carriage, so that, when the handle is at bottom dead center, that is, when the bread toaster in its toasting position, the position of the control knob is maintained unchanged relative to the handhold. Because both the control knob and the handle travel the same distance as the carriage is raised and lowered, relative integration of the two controls becomes possible.

According to the invention, the pivot or bearing points for the extra-lift device may be provided on the carriage or on the toasting rack supporting the carriage. By contrast, in the prior art the extra-lift device takes support upon the housing of the bread toaster. The arrangement of the invention results in the advantage that the bearing forces of the extra-lift device which cause the toasting rack to be moved to top dead center and be maintained in this position are received by the carriage. This prevents jamming to a large degree. The extra-lift device may also be secured to the toasting rack which in turn takes support upon the carriage.

In a first embodiment, the extra-lift device includes a lever having a first and a second lever arm, the lever is pivotally mounted on either the carriage or the toasting rack in a pivot joint, and on pivotal movement of the first lever arm out of its position of rest, the second lever arm acts on the carriage or on the toasting rack such as to cause the latter to be raised relative to the carriage. In this arrangement, only a single lever arm acts on the toasting rack, resulting in a particularly simple and low-cost extra-lift device for a bread toaster.

To prevent the transmission of transverse forces from the lever to the toasting rack on operation of the extra-lift device while, on the other hand, the displacement force on the control knob is extremely low, it is suggested in a further development of the invention to provide at the free end of the second lever arm a turning and sliding joint which, on pivotal movement of the first lever arm, moves alongside a slide rod extending parallel to the toasting rack and firmly connected therewith. Low frictional and, accordingly, transverse forces being produced in the turning and sliding joint, transverse forces do not occur in the bearing bushings sliding along the guide rods, thus eliminating the risk of a jammed condition of the toasting rack.

To ensure that the extra-lift device rests at all times against the toasting rack without clearance and the toasting rack automatically returns to its initial position following operation of the extra-lift device, the toasting rack and the carriage are advantageously coupled to each other by at least one tension spring. Thus, operation of the extra-lift device requires, in addition to the frictional forces, the application of a force causing an extension of the tension spring. However, this force need only be dimensioned sufficient for the toasting rack to be retracted to its initial position closest to the carriage.

In a third embodiment, it is suggested to couple the toasting rack to the carriage by means of a guide bar rotatably mounted on both members, in which arrangement also the free end of the second lever arm is rotatably mounted on the toasting rack, and the second lever arm and the guide bar extend invariably in a parallel relationship to each other in any position of the lever. By arranging the second lever arm parallel with the guide bar, the toasting rack is at all times guided parallel to the carriage, thus eliminating the need to guide the toasting rack by means of the guide rods. This embodiment, however, requires the toasting rack to be arranged in the toasting chamber such that it does not hit against the guide rods or other housing parts in the interior of the bread toaster as a result of the lateral displacement inevitably occurring as the toasting rack is raised by the extra-lift device.

In a further development of the invention, in the proximity of the upper limit position of the carriage, the lever of the extra-lift device is adapted to be displaced and locked in position by a manually actuatable locking device. The locking device enables the extra-lift device to be locked in position after the toasting rack is extended, thus holding the toasting rack in its extended position. However, this position can be maintained only as long as the carriage is likewise in its upper position ready for removal of toasted bread.

As soon as the carriage is retracted down into the toasting chamber, the extra-lift device will disengage itself from the locking device, and the toasting rack will move downwards together with the carriage. This embodiment finds particularly useful application where a large number of articles of the same small diameter are to be toasted in succession. The operator will then be required to perform a manual operation only once in order to activate the extra-lift device for a prolonged period of time. In order not to impair the introduction of force through the locking device or the interlocking mechanism, a cam mechanism may be provided by means of which an optimum sequence of motions is accomplished in the presence of a low manual force.

In a fourth embodiment of the invention, both the carriage and the toasting rack are guided on the guide by a second and, respectively, first holding means, and the first holding means is moved by the second holding means. This results in the advantage that the control knob for the extra-lift device and the handle are movable as one and suitable for relative integration. An operator will find the control knob and the handle in one and the same place on the bread toaster and will not be required to perform complicated manipulations in order to reach from the handle to the control knob.

By arranging for the first and second holding means to be guided on a common guide rod at either end of the toasting rack and the carriage, an extra-lift device is accomplished which is particularly jam-free and coupled to the carriage in a simple manner. In this arrangement, the extra-lift device advantageously includes a lever having only one lever arm which is connected fast with the toasting rack, and the lever with its lever arm is movable in upward or downward direction alongside the guide. By virtue of the one lever arm, the control knob of the extra-lift device is thus slidable parallel to the direction of movement of the handle. When the toasting rack is raised by operation of the control knob, this control knob is likewise raised, in contrast to the first and third embodiment.

The fourth embodiment thus avoids a lever mechanism, therefore affording particular ease of manufacture. In this arrangement, it is further advantageous that the control knob moving along a recess provided on the handle is mounted on the free end of the lever arm. Thus, if the control knob for the extra-lift device is integrated in a recess of the handhold, such integral construction results in the advantage that access to both the handle and the control knob is extremely practical and easy.

In a fifth embodiment of the invention, the extra-lift device includes a first engaging member provided on the toasting rack, the first engaging member engages in a second engaging member rotatably coupled to the control knob, and the second engaging member is rotatably mounted on the carriage by means of a trunnion connected to it at right angles. This arrangement has the advantage that the control knob is fixedly yet rotatably secured in the handhold, thereby obviating, as is the case in the fourth embodiment due to the axial displacement of the control knob, the need for a longitudinal slot in the handle for extension therethrough of the first lever arm carrying the control knob on the one hand, while on the other hand the control knob is fully integrated in the handle and still readily recognizable.

A particularly good force transmission from the control knob to the toasting rack is accomplished in that a toothed structure extending substantially in the direction of the guide is provided on the first and second engaging member. To achieve a particularly stable mounting of the control knob, the trunnion is additionally received in a bore provided in the handle, with the control knob being formed at the free end of the trunnion.

In a sixth embodiment, the first engaging member is formed by a joint bolt and the second engaging member is formed by a lever provided with an elongated hole, with the joint bolt engaging into the elongated hole of the lever. Instead of the toothed structure as provided in the fifth embodiment, a joint bolt engaging in an elongated hole was selected in this embodiment.

In order to be able to limit the motion of the toasting rack relative to the carriage in a simple manner in the last three embodiments, the holding means are U-shaped structures which are in relative engagement by means of brackets. To secure the holding means against relative rotation in the guide rods, a pin is formed on the upper bracket of the second holding means for engagement in a longitudinal slot extending on the first holding means in the longitudinal direction of the guide.

To prevent the extra-lift device from being shifted during the toasting cycle, the control knob of the extra-lift device is covered by the outer wall of the housing during toasting, or the control knob moves into a recess not accessible from the outside on operation of the handhold.

BRIEF DESCRIPTION OF THE DRAWINGS

Six embodiments of the present invention will be described in more detail in the following with reference to the accompanying drawings, in which.

DESCRIPTION OF PARTICULAR EMBODIMENTS

Figure 1:
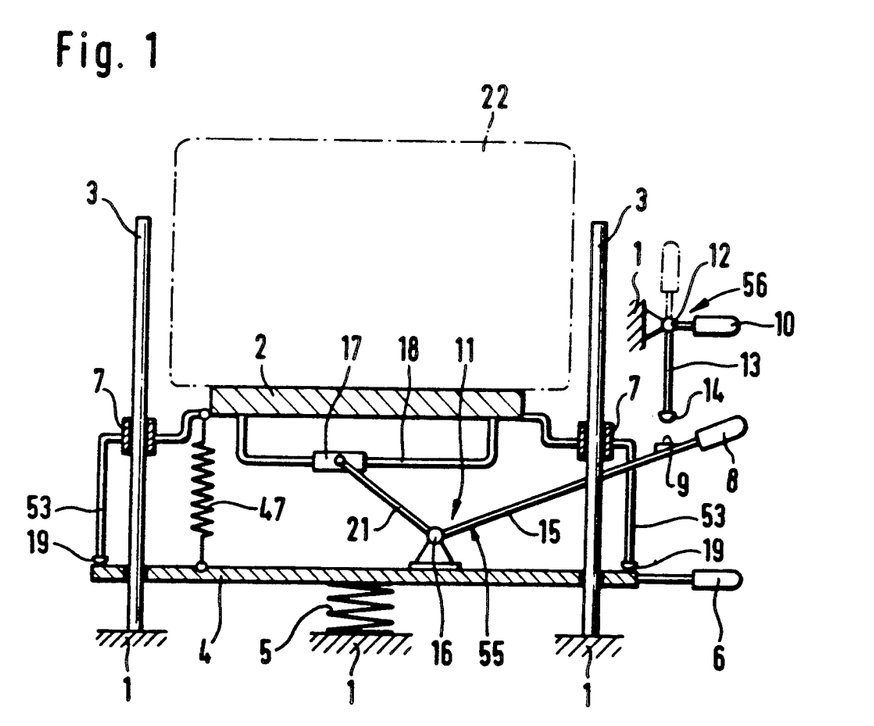
FIG. 1 is a schematic kinematic representation of a first embodiment, illustrating an extra-lift device actuatable by a pivotal lever and including a turning and sliding joint, in which the lever is pivotally mounted on the carriage.

As becomes apparent from FIG. 1, on a housing 1 of a bread toaster guides 3 are provided extending parallel to each other for guiding a toasting rack 2 and a carriage 4, the latter being manually slidable between an upper and a lower limit position by means of a manual operating handle 6. To start the toasting cycle, the carriage 4 is moved to its lower limit position by means of the handle 6. An actuation mechanism 5 shown only schematically returns the carriage 4 from its lower limit position to its upper limit position on completion of the toasting cycle. Movement of carriage 4 to its upper limit position causes at the same time the toasting rack 2 to be raised for removal of the toasted article from the bread toaster.

According to FIG. 1, the toasting rack 2 is arranged above the carriage 4 at a small relative distance, resting in two bearing points 19 on the carriage 4 with two structural members 53 serving a spacing function. Provided on the spacing members 53 are bearing bushings 7 through which the guides 3 extend. Further, a tension member comprised of a tension spring 47 in FIG. 1 is provided between the carriage 4 and the toasting rack 2, so that the toasting rack 2 is likewise guided by the guide rods 3 and coupled to the carriage 4. The toasting rack 2 is adapted to be raised still higher than the carriage 4 in any position of the carriage.

If an article of larger dimensions is placed in the toaster, it can be removed from the slot (not shown) of the bread toaster upon completion of the toasting cycle without requiring an additional raising motion of the toasting rack 2. By contrast, if an article of such small dimensions is toasted that it cannot be grasped even though the carriage 4 is in its upper limit position, only the additional lifting motion of the toasting rack 2 enables its removal. In the embodiment of the invention shown in FIG. 1, this is accomplished by an extra-lift device 11 which incorporates a lever 55 acting at both ends and being pivotal about a pivot joint 16, the lever having a first lever arm 15 and a second lever arm 21, and a turning and sliding joint 17.

The toasting rack 2 is raised by the first lever arm 15 by pushing down on a control knob 8. The torque thereby supplied is transmitted to the second lever arm 21 and, via the pivot joint 16, to the turning and sliding joint 17. On pivotal movement of the lever arms 15, 21 about the pivot joint 16 in clockwise direction, the turning and sliding joint 17 will move to the right on a slide rod 18. The slide rod 18 being rigidly coupled to the toasting rack 2, the toasting rack 2 is raised on movement of the two lever arms 15, 21. The return motion of the toasting rack 2 when the control knob 8 is released can be accomplished by its own weight or by means of the tension spring 47. It is essential in this arrangement that the pivot joint 16 and the bearing points 19 bear against the carriage 4 and not against the housing 1 of the bread toaster.

In the embodiment of the extra-lift device 11 described with reference to FIG. 1, a separate control operation is necessary if it is desired to give the toasting rack 2 an extra lift. Operation of this extra-lift device can be simplified by providing an interlocking mechanism 56 comprised of a detent lever 10, a snap-in joint 12, a rod 13 and a sliding member 14.

If no extra lifting motion of the toasting rack 2 is intended, the detent lever 10 is in the vertical position shown in broken lines, preventing the sliding member 14 from bearing upon the first lever arm 15. However, if it is necessary to toast a major number of smaller slices in succession, the operator brings the detent lever 10 into the horizontal position shown in FIG. 1. As the carriage 4 travels upwardly on completion of the toasting cycle, the sliding member 14 will automatically act upon a guide cam 9 formed on the first lever arm 15. The interlocking mechanism 56 being immovably mounted on the housing 1, the upward motion of the carriage is translated into an extra lifting motion of the toasting rack 2 in the area of the upper limit position of the carriage. In this arrangement, the amount of travel of the carriage 4, related to the interlocking mechanism 56, must be sufficiently large for the first lever arm 15 to be pushed down a sufficient amount.

Figure 2:
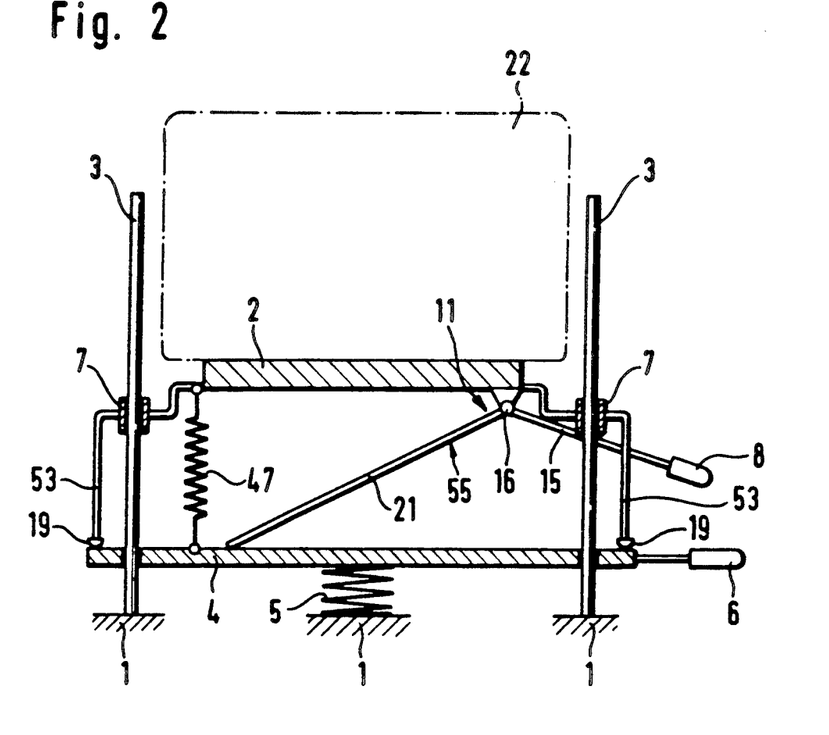
FIG. 2 is a representation similar to FIG. 1, in which, however, the lever is pivotally mounted on the toasting rack (second embodiment)

The embodiment illustrated in FIG. 2 differs from FIG. 1 only in that the lever 55, rather than being mounted on the carriage 4, is pivotally mounted on the toasting rack 2 by means of the pivot joint 16, and that the lever arm 21, rather than resting on the toasting rack 2 by means of a turning and sliding joint 17, rests with its free end directly on the carriage 4. As a result of this kinematic reversal, actuation of the first lever arm 15 causes it to move in upward rather than downward direction. Correspondingly, operation of the interlocking mechanism 56 is also reversed.

Figure 3:
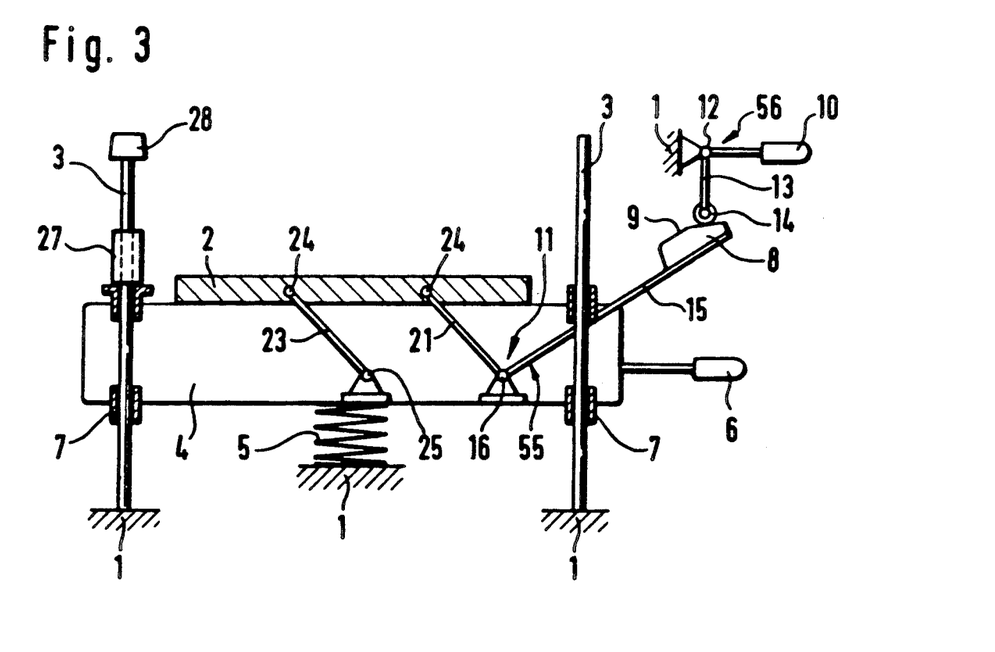
FIG. 3 is a schematic kinematic representation of a third embodiment, illustrating an extra-lift device actuatable by a pivotal lever, with a parallel guide.

By contrast, the third embodiment of the invention shown in FIG. 3 includes, in addition to the two-armed lever 55, a guide bar 23 having one end pivotally mounted on the toasting rack 2 in a bearing point 24 while its other end is pivotally mounted on the carriage 4 in another bearing point 25. When the lever arm 15 of the lever 55 is moved downwards, the guide bar 23, while causing the toasting rack 2 to be displaced also to the right as it moves upwardly (in contrast to FIGS. 1 and 2), provides for its upward movement parallel to the carriage 4.

The interlocking mechanism 56 described with reference to FIG. 1 and comprised of the structural members 10, 12, 13 and 14 is also suitable for use in the embodiments of FIGS. 2 to 4 described in the following, as shown in FIG. 2 by way of example. By means of the sliding member 14 and a suitable selection of the guide cam 9, an appropriate sequence of motions for raising the toasting rack 2 can be accomplished.

For instance, the guide cam 9 may be selected such that movement of the toasting rack 2 is not speeded up excessively, in order to prevent the toasted article from being ejected out of the bread toaster. To reduce the speed in the upper limit position of the carriage 4 or the toasting rack 2, a cushioning means 27 may be provided. In FIG. 3, the cushioning means 27 is comprised of a length of flexible hose which is slipped onto the guides 3. A short distance before the upper limit position of the carriage 4, the hose which takes support upon the carriage will abut against a stop means 28, collapse and thus cushion the impact. The hose is preferably a heat-resistant silicone fabric hose.

Figure 4:
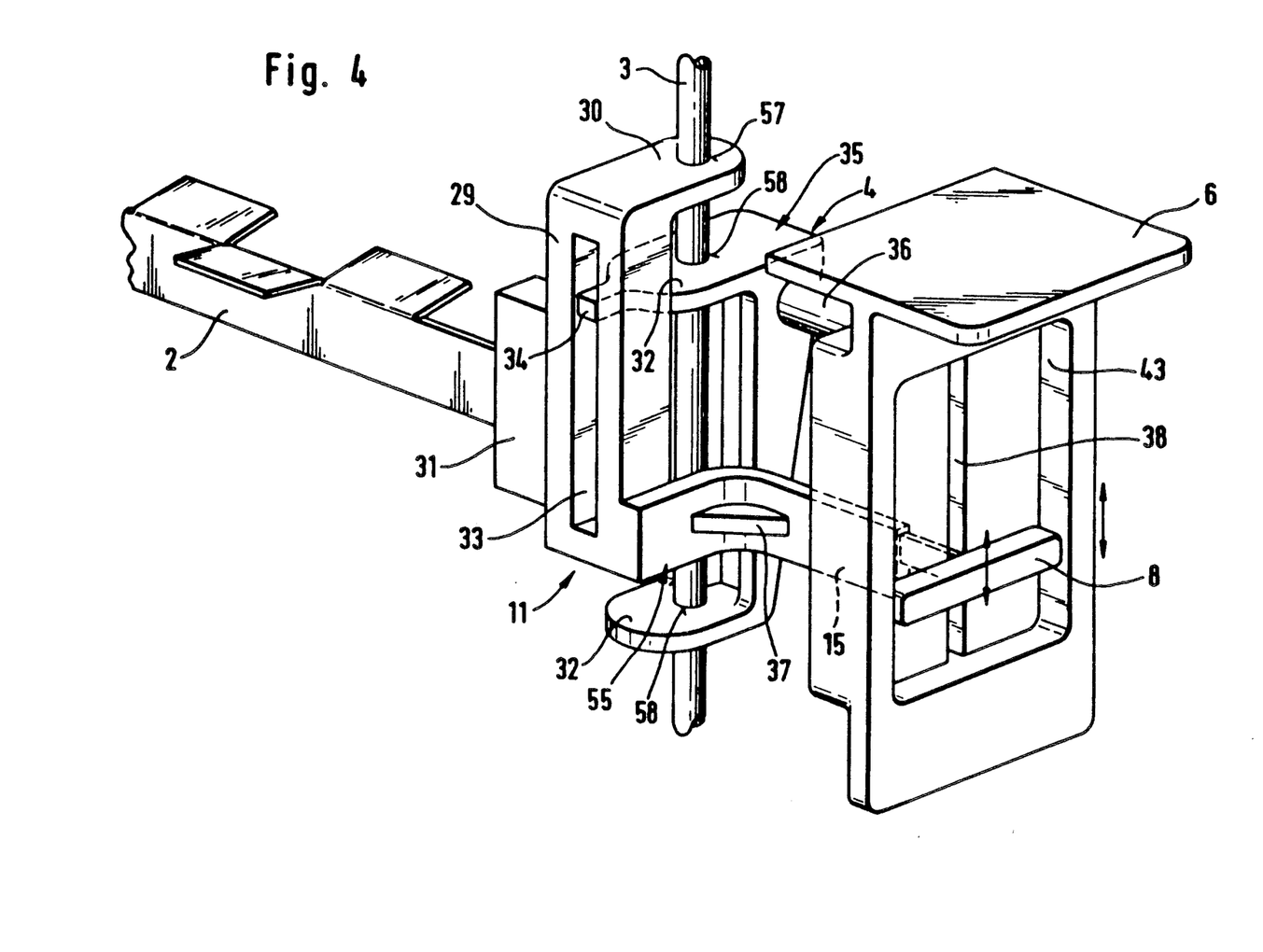
FIG. 4 is a perspective view of a fourth embodiment, illustrating an extra-lift device to be actuated by a lever slidable parallel to the carriage.

In FIG. 4, the toasting rack 2 is mechanically coupled to the control knob 8 for operation of the extra-lift device 11 by means of an intermediate member 31, a first holding means 29 and the lever arm 15. A reinforcing member 37 secures the lever arm 15 to the first holding means 29. The first holding means 29 includes two brackets 30 (of which only one is shown in FIG. 4) arranged to slide on the guide rod 3 in bores 57. The brackets 30 combine with the holding means 29 to provide a U-shaped structure to which the toasting rack 2 is secured. In the arrangement described thus far, the toasting rack 2 could be shifted along the guide 3 by means of the control knob 8.

The manual operating handle 6 for lowering the carriage 4 is connected to a second holding means 35 by a coupling member 36, the second holding means having the same U-shaped structure incorporating brackets 32 as the first holding means 29. The second holding means 35 is equally arranged to slide on the guide 3 in bores 58. The respective brackets 30 and 32 of the respective first and second holding means 29 and 35 are in such relative arrangement that a bracket 32 of the holding means 35 engages between the two brackets 30 of the holding means 29, so as to enable a relative axial displacement of the two holding means 29 and 35 within the span of the brackets 32.

In the lifting motion which the first holding means 29 is capable of executing relative to the second holding means 35, both holding means 29, 35 are secured against relative rotation by a pin 34 engaging in a longitudinal slot 33. Longitudinal slots 33 are provided on both the first and the second holding means 29 and, respectively, 35 (not shown in FIG. 4). Equally, pins 34 are provided at opposite ends on both holding means 29, 35 (not shown on holding means 29).

The guiding of the carriage 4 and the toasting rack 2 described thus far is also suitable for use in the embodiments of FIGS. 1 to 3.

In order that the control knob 8 and the lever 15 are displaceable within the handhold 6 in the direction of the guide 3, a longitudinal opening 38 for the lever arm 15 is provided in FIG. 4. As FIG. 4 further shows, the control knob 8 for the ,toasting, rack 2 is integrated into a recess 43 of the handle 6. The control knob 8 being not directly accessible, the user of the bread toaster is prevented from operating it accidentally if only bread of sufficiently large dimensions is to be toasted. In the event that the carriage 4 was moved into the toaster operating position by the handle 6, the control knob 8 is additionally covered by the housing wall (not shown) of the bread toaster, thereby obviating the possibility of accidental actuation of the extra-lift device 11.

The cooperative relationship between the holding means 29 and 35 and the parallel guides 3 advantageously enables the toasting rack 2 to be displaced with ease and without becoming jammed, if an article of smaller dimensions is to be raised an extra amount. As further shown in FIG. 4, the control knob 8 and the handle 6 have to be moved towards each other to give the toasted article the extra lift. Compression springs (not shown) may be provided on the guides 3 between the brackets 30 and 32 to provide a cushioning effect.

Figure 5:
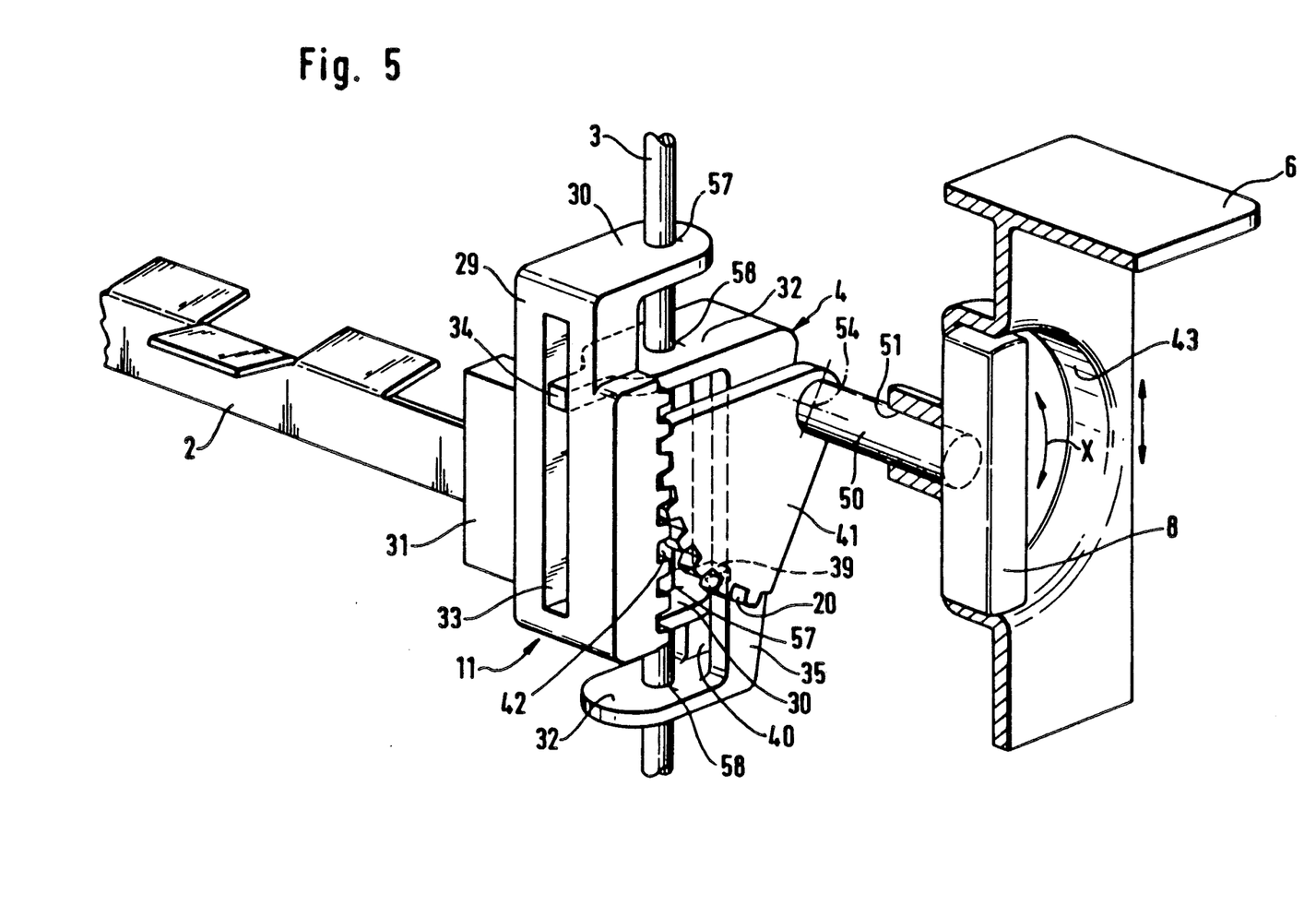
FIG. 5 is a perspective view of a fifth embodiment, illustrating an extra-lift device including a lever mechanism provided with a toothed structure.

The fifth embodiment of an extra-lift device as shown in FIG. 5 differs from the embodiment illustrated in FIG. 4 in that a toothed structure 42 extending in a straight line in the direction of the guide 3 is provided between the first holding means 29 and the control knob 8. The toothed structure 42 on the first holding means 29 is engaged by a further toothed structure 20 of a toothed segment 41. The toothed structure 20 of the toothed segment 41 lies on a section of a circular arc having acting on its pivot center 54 a trunnion 50 which has one end rotatably mounted on the holding means 35 while its other end is rotatably received in a bore 51 in the handhold 6. The end of the trunnion 50 extending through the bore 51 is coupled to the control knob 8 in a manner preventing relative rotation.

In the extra-lift device of FIG. 5, the control knob 8 is actuated by giving it a turning motion. Turning the control knob 8 clockwise (arrow X) causes the toothed segment 41 to lift the first holding means 29 upwardly along the guide 3. As becomes further apparent from FIG. 5, the two holding means 29 and 35 include a respective pin 39 and 34 engaging in a respective longitudinal slot 40 and 33 provided in the respective holding means.

Figure 6:
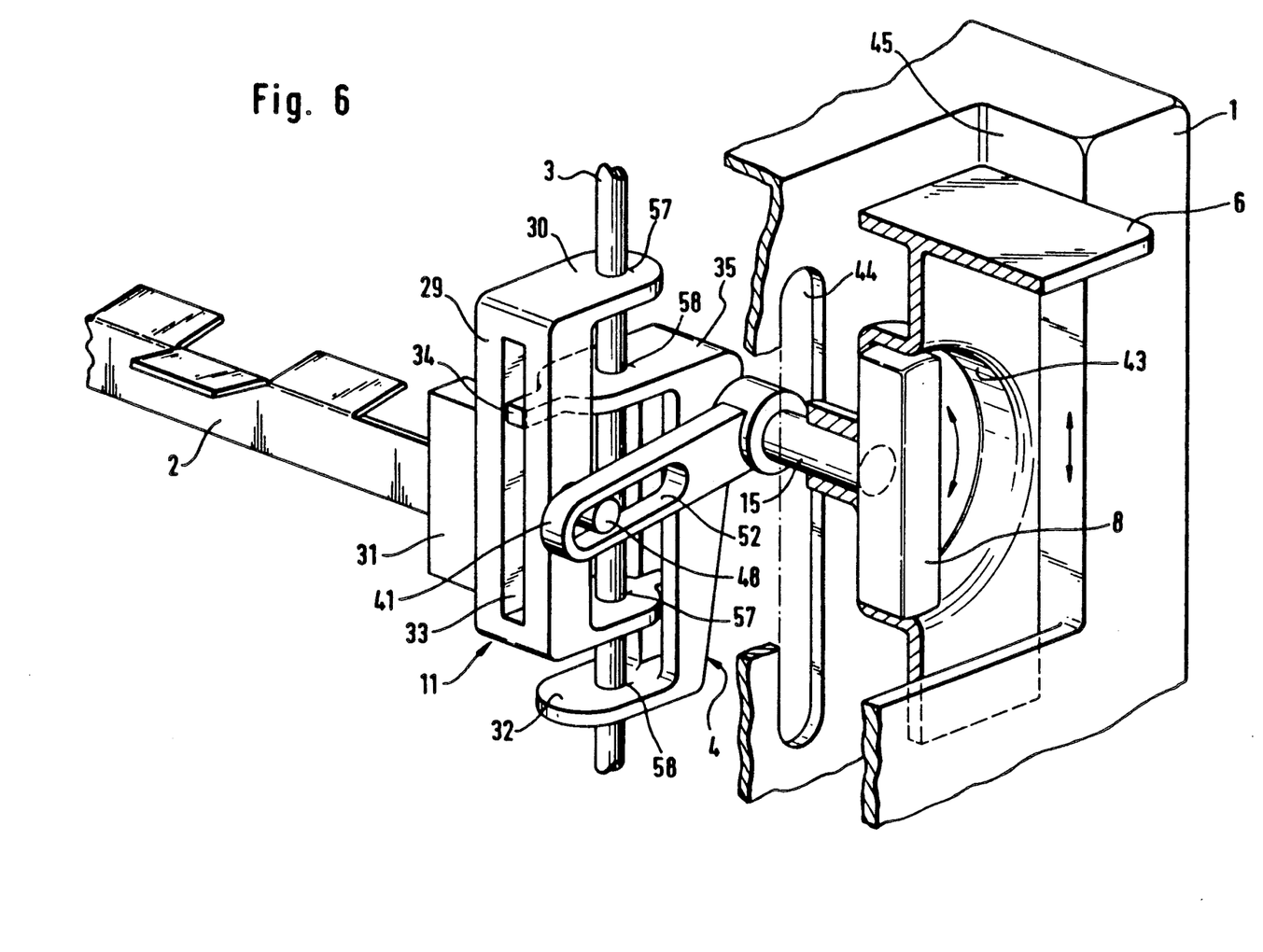
FIG. 6 is a perspective view of a sixth embodiment, illustrating an extra-lift device including a turning and sliding joint, with a bolt-and-elongated hole guide.

The sixth embodiment of the invention as shown in FIG. 6 differs from the embodiment of FIG. 5 in that the force transmission is accomplished by means of a bolt-and-elongated-hole coupling, rather than by tooth engagement, with a joint bolt 48 which is secured to the first holding means 29 engaging in an elongated hole 52.

To avoid that the toasting rack, in its upward movement to top dead center, has such an accelerative effect on the toasted article as to eject it out of the well, it will be advantageous to provide a cushioning means or a spring-loaded tensioning device between the toasting rack and the lifting device. The cushioning means is preferably a flexible, heat-resistant hose made of a silicone fabric, for example, which is provided on the guide rod for the toasting rack.

To avoid repetitions, parts fulfilling like functions have been assigned like reference numerals in FIGS. 1 through 6.

We claim:

1. A bread toaster comprising guide structure, carriage structure, operating handle structure coupled to said carriage structure, said carriage structure being manually slidable in said guide structure between an upper limit position and a lower limit position by means of said handle structure; toasting rack structure adapted to receive an article to be toasted and mounted for movement in conjunction with said carriage structure, said upper limit position of said carriage structure serving to position said toasting rack structure to receive or withdraw the article, while the lower limit position serves for turning power on for toasting the article, an extra-lift device, and a control knob for operating said extra-lift device to enable said toasting rack structure to be raised relative to said carriage structure, said extra-lift device being carried by at least one of said carriage structure and said toasting rack structure.

2. The bread toaster as claimed in claim 1 wherein said extra-lift device includes a lever having first and second lever arms, a pivot coupling for pivotally mounting said lever on one of said carriage structure and said toasting rack structure, said lever, on pivotal movement of said first lever arm out of its position of rest, causing said second lever arm to act on one of said carriage structure and said toasting rack structure to cause said toasting rack structure to be raised relative to said carriage structure.

3. The bread toaster as claimed in claim 2 and further including a slide rod extending parallel to said toasting rack and firmly connected therewith and a turning and sliding joint at the free end of said second lever arm, said joint, on pivotal movement of said first lever arm, moving along said slide rod.

4. The bread toaster as claimed in claim 3 and further including at least one tension spring coupling said toasting rack structure and said carriage structure to each other.

5. The bread toaster as claimed in claim 2 wherein said free end of said second lever arm is rotatably mounted on said toasting rack structure, and said second lever arm and said guide structure extend in parallel relationship to each other in any position of said lever.

6. The bread toaster as claimed in claim 2 and further including a lever coupled to said extra-lift device and a manually actuatable locking device in the proximity of said upper limit position of said carriage structure for displacing and locking said extra-lift device in position.

7. The bread toaster as claimed in claim 1 and further including first and second holding structure, said carriage structure and said toasting rack structure being guided on said guide structure by said first and second holding structure, respectively, and said first holding structure being adapted to be moved by said second holding structure.

8. The bread toaster as claimed in claim 7 wherein said extra-life device includes a lever with only one lever arm which is connected fast with said toasting rack structure, said lever with its lever arm being movable in upward or downward direction along said guide structure.

9. The bread toaster as claimed in claim 8 wherein said handle includes a recess, and said knob is disposed in said recess and is mounted on the free end of said lever arm for movement in said recess.

10. The bread toaster as claimed in claim 3 wherein said extra-lift device includes a first engaging member on said toasting rack structure, and further including a second engaging member rotatably coupled to said control knob, said second engaging member being rotatably mounted on said carriage structures by means of a trunnion connected to it at right angles.

11. The bread toaster as claimed in claim 10 and further including a toothed structure extending substantially in the direction of said guide structure on said first and second engaging members.

12. The bread toaster as claimed in claim 10 wherein said trunnion is additionally received in a bore in said handle, and said control knob is at the free end of said trunnion.

13. The bread toaster as claimed in claim 7 wherein said first engaging member includes a joint bolt and said second engaging member includes a lever with an elongated hole, and said joint bolt engages into said elongated hole of said lever.

14. The bread toaster as claimed in claim 7 wherein said holding structures are U-shaped structures that are held in relative engagement by brackets.

15. The bread toaster as claimed in claim 7 wherein said second holding structure includes a pin for engagement in a longitudinal slot in said first holding structure that extends in the longitudinal direction of said guide structure.

16. The bread toaster as claimed in claim 1 wherein said extra-lift device includes a lever with first and second lever arms, said lever being pivotally mounted on either said carriage or said toasting rack, and that on pivotal movement of said first lever arm out of its position of rest, said second lever arm acts on said carriage or on said toasting rack such as to cause said toasting rack to be raised relative to said carriage, and further including a manually actuatable locking device for locking in position, said lever of said extra-lift device in the proximity of the upper limit position of said carriage.

17. The bread toaster as claimed in claim 16 wherein both said carriage structure and said toasting rack structure are guided on said guide structure by first and second U-shaped holding means, said first holding means being moved by said second holding means.

18. The bread toaster as claimed in claim 16 wherein said control knob of said extra-lift device is covered by the outer wall of said housing when said carriage structure is in said lower limit position.

19. The bread toaster as claimed in claim 18 wherein said extra-lift device includes a first engaging member on said toasting rack structure said first engaging member engages a second engaging member rotatably coupled to said control knob, and said second engaging member is rotatably mounted on said carriage structure by means of a trunnion connected to it at right angles.

20. The bread toaster as claimed in claim 18 said trunnion is additionally received in a bore provided in said handle, and said control knob is at the free end of said trunnion.

* * * * *